(12) United States Patent
Guo et al.

(10) Patent No.: US 11,221,281 B2
(45) Date of Patent: *Jan. 11, 2022

(54) HEAT TREATMENT DEVICE FOR SLIDE SPECIMEN TESTING

(71) Applicant: XIAMEN TALENT BIOMEDICAL TECHNOLOGY COMPANY, LTD., Fujian (CN)

(72) Inventors: James Guo, Guangdong (CN); Derek Guo, Guangdong (CN)

(73) Assignee: XIAMEN TALENT BIOMEDICAL TECHNOLOGY COMPANY, LTD., Fujian (CN)

(*) Notice: Subject to any disclaimer, the term of this patent is extended or adjusted under 35 U.S.C. 154(b) by 673 days.

This patent is subject to a terminal disclaimer.

(21) Appl. No.: 16/087,099

(22) PCT Filed: Mar. 21, 2017

(86) PCT No.: PCT/CN2017/077572
§ 371 (c)(1),
(2) Date: Sep. 21, 2018

(87) PCT Pub. No.: WO2017/162150
PCT Pub. Date: Sep. 28, 2017

(65) Prior Publication Data
US 2019/0101479 A1    Apr. 4, 2019

(30) Foreign Application Priority Data

Mar. 21, 2016 (CN) .......................... 201610160797.0
Aug. 31, 2016 (CN) .......................... 201610798074.3

(51) Int. Cl.
*G01N 1/44*        (2006.01)
*G01N 1/36*        (2006.01)
(Continued)

(52) U.S. Cl.
CPC .............. *G01N 1/44* (2013.01); *B01L 7/02* (2013.01); *B01L 7/525* (2013.01); *B01L 7/54* (2013.01);
(Continued)

(58) Field of Classification Search
CPC ...... B01L 7/54; B01L 9/52; B01L 2300/1838; B01L 2300/185; B01L 7/00; B01L 7/02;
(Continued)

(56) References Cited

U.S. PATENT DOCUMENTS 3,503,683 A    3/1970  Isreeli et al.
4,486,389 A *  12/1984 Darnell ................. A61M 5/445
                                              165/46
(Continued)

FOREIGN PATENT DOCUMENTS

CN           2837851        11/2006
CN         103196732         7/2013
(Continued)

OTHER PUBLICATIONS

"International Search Report (Form PCT/ISA/210)", dated Jul. 10, 2017, with English translation thereof, pp. 1-4.

*Primary Examiner* — Jill A Warden
*Assistant Examiner* — Dwayne K Handy
(74) *Attorney, Agent, or Firm* — JCIPRNET

(57) ABSTRACT

Provided is a heat treatment device for slide specimen testing, and the heat treatment device mainly includes a container, a base, a heater, a liquid outlet, a liquid inlet, a controller and a thermocouple. When such device is used together with devices such as a slide cover plate and a slide rack, a large amount of slide specimens can be carried out steps of reagent loading, cleaning, heat treatment, temperature maintaining and drying inside one same device, especially multi-step operations such as an immunohistochemi-
(Continued)

cal testing, an original hybrid gene testing, and other protein testing, DNA nucleotide and gene testing on the slide specimen. All testing on the slide specimen is enabled to be performed in one same device from the beginning to the end, guaranteeing that all slide specimens are completely covered by the reagent from the beginning to the end, and all slide specimens are carried out the heat treatment at a uniform temperature. The operation procedures are simplified, and reliability and repeatability of slide specimen processing are enhanced.

16 Claims, 8 Drawing Sheets

(51) Int. Cl.
| | | |
|---|---|---|
| | *G01N 35/00* | (2006.01) |
| | *B01L 7/02* | (2006.01) |
| | *B01L 7/00* | (2006.01) |
| | *G01N 1/10* | (2006.01) |
| | *G01N 1/31* | (2006.01) |
| | *G01N 1/38* | (2006.01) |
| | *B01L 3/00* | (2006.01) |
| | *B01L 9/00* | (2006.01) |

(52) U.S. Cl.
CPC .............. *G01N 1/10* (2013.01); *G01N 1/312* (2013.01); *G01N 1/36* (2013.01); *G01N 1/38* (2013.01); *G01N 35/00029* (2013.01); *B01L 3/50855* (2013.01); *B01L 9/52* (2013.01); *B01L 2200/147* (2013.01); *B01L 2400/0406* (2013.01); *B01L 2400/0487* (2013.01); *B01L 2400/0694* (2013.01); *B01L 2400/082* (2013.01); *G01N 2001/386* (2013.01); *G01N 2035/00138* (2013.01); *G01N 2035/00356* (2013.01)

(58) Field of Classification Search
CPC ... B01L 7/50; G01N 1/44; G01N 2035/00356
See application file for complete search history.

(56) References Cited

U.S. PATENT DOCUMENTS

| | | | | |
|---|---|---|---|---|
| 4,975,250 | A * | 12/1990 | Mordecki | B01L 9/52 |
| | | | | 211/41.14 |
| 4,985,206 | A * | 1/1991 | Bowman | B01L 9/52 |
| | | | | 118/500 |
| 5,023,187 | A * | 6/1991 | Koebler | B01L 3/5085 |
| | | | | 118/641 |
| 5,302,347 | A * | 4/1994 | Van Den Berg | B01L 7/52 |
| | | | | 422/536 |
| 7,722,839 | B2 * | 5/2010 | Kuzyk | A01N 1/0242 |
| | | | | 422/307 |
| 10,823,647 | B2 * | 11/2020 | Guo | G01N 35/00029 |
| 10,830,679 | B2 * | 11/2020 | Guo | C12M 23/58 |
| 2009/0027770 | A1 * | 1/2009 | Ljungmann | B01L 9/52 |
| | | | | 359/391 |
| 2009/0233375 | A1 * | 9/2009 | Jarvis | A01N 25/34 |
| | | | | 436/151 |

FOREIGN PATENT DOCUMENTS

| | | |
|---|---|---|
| CN | 105675369 | 6/2016 |
| CN | 106153436 | 11/2016 |
| JP | 2014153283 | 8/2014 |

* cited by examiner

HEAT TREATMENT DEVICE FOR SLIDE SPECIMEN TESTING

CROSS-REFERENCE TO RELATED APPLICATION

This application is a 371 of international application of PCT application serial no. PCT/CN2017/077572, filed on Mar. 21, 2017, which claims the priority benefit of China application no. 201610160797.0, filed on Mar. 21, 2016, and also claims the priority benefit of China application no. 201610798074.3, filed on Aug. 31, 2016. The entirety of each of the abovementioned patent applications is hereby incorporated by reference herein and made a part of this specification.

TECHNICAL FIELD

The present invention belongs to a field of biological specimen processing, and specifically relates to a device for processing a slide specimen.

BACKGROUND

The whole process of tests of proteins, pathogens or genes, such as by immunohistochemistry and by in-situ hybridization gene testing, on a slide specimen requires dozens of complicated steps, and accuracy of the test result thereof may be severely affected by various factors such as environment and manual operation. Simplifying an operation process and reducing an influence of environment are of the highest priority to enhance an efficiency and accuracy of specimen testing.

Generally, during the specimen processing, a majority of specimens require a heat treatment, which is a necessary step to enable a protein testing or a gene testing to reach a required sensitivity and specificity. The heating is generally performed at a temperature of 80-121° C. and maintained for 3 to 60 minutes. The most common methods are as follows: cooking in an autoclave, conventional boiling, cooking in a microwave oven, heating in water bath or baking. However, container or shelf that is used for slide specimen processing in the operation at present is neither heat-resisting, nor has a heating function. During the slide specimen processing, the slide specimen needs to be transferred into a heatable container, and then transferred back to a normal-temperature operation desk, increasing the complexity of the operation process and the operation error.

The present invention achieves that during the slide specimen processing, a heat treatment device can be used with relative inventions to enable each step that requires heating and that doesn't require heating during the slide specimen processing to be carried out inside one same device, simplifying the operation steps of the slide specimen processing, and enhancing an efficiency and reliability of the slide specimen processing.

SUMMARY OF THE INVENTION

In order to solve the above problems, a heat treatment device for slide specimen testing is provided, which enables a large amount of slides to be closely placed in a heatable container and is equipped with a liquid-filling device and a liquid-discharging device, and enables each step that requires and doesn't require heating during the slide specimen processing to be carried out inside one same device, simplifying the operation steps of the slide specimen processing, and enhancing an efficiency and reliability of the slide specimen processing.

Objectives of the present invention are achieved at least by one of the following technical solutions.

A heat treatment device for slide specimen testing, comprises a container, a base, a heater, a liquid outlet, a liquid inlet, a controller and a thermocouple.

The heater is located above the base and below the container; the container is used for placing a heating medium and one or more slide racks; the controller is used for controlling the heater to start and to stop, and the heater is used for heating the medium in the container; the thermocouple is placed inside the container, and the thermocouple performs a real-time sense on a temperature in the container and transfers a sensed data to the controller.

The liquid inlet allows a heating medium or reagent stored in an external container to be added to the container quantitatively when required; and the liquid outlet allows the heating medium or liquid in the container to be discharged from the container.

Further, the heater which is provided at a bottom of the container adopts electrical bar heating, electrical wire heating, microwave heating, electromagnetic induction heating or thereto medium cyclic heating; and the heater and the container form a connected structure or a detachable structure.

Further, the liquid inlet and the liquid outlet on the container are respectively further connected with a micropump or a magnetic valve, and the controller controls operation of the micropump or the magnetic valve, then realizing control of filling the container with liquid or discharging liquid from the container.

Further, an edge of the container is a right-angle structure, and a bottom of the container is a plane structure.

Further, the heat treatment device for slide specimen testing further comprises at least one slide rack, two ends of the slide rack are hung on two lateral sides facing toward each other of the container, so that a gap is provided between a bottom end of a slide assembly in the slide rack and a bottom of the container; the slide rack is provided with a plurality of integrated V-shape insertion slots which are upright or inclined, and a spring piece is fixed inside each V-shape insertion slot; a plurality of V-shape insertion slots are arranged in one column closely, and the slide rack comprises one or more columns of V-shape insertion slots; an outline of an upper end of the slide assembly assembled by a slide and a cover plate matches with the V-shape insertion slot on the rack, so that the slide assembly can be inserted in the V-shape insertion slot on the slide rack, and a plurality of slide assemblies are arranged closely.

The spring piece and the V-shape insertion slot of the slide rack form an integrated connection structure, or are configured as independent separation; when the independent separation is adopted, the spring piece is fixed inside the V-shape insertion slot by means of embedding or adhesion; when the slide assembly is inserted in the V-shape insertion slot, a surface of the cover plate presses the spring piece, and the spring piece plays a function of clamping the slide and the slide cover plate.

Further, each V-shape insertion slot is inserted with a slide assembly, and a plurality of slide assemblies in one same container are heated at a temperature controlled by a single controller. The slide assembly inserted in the V-shape insertion slot is upright or inclined, with an angle between the slide assembly and the vertical direction of 1° to 90°.

Further, when the slide assembly is in the heat treatment, the heating medium in the container can be heated to boiling, and a temperature of the heat treatment can be controlled by using a heating medium having a constant boiling point.

Further, the slide assembly is assembled by the slide and the cover plate; the cover plate comprises a capillary plane, a depth locating surface, a width locating block, a bottom locating block, a reservoir side surface and a reservoir opening surface. Two depth locating surfaces are provided above two lateral sides facing toward each other of the capillary plane, and the capillary plane is parallel to the depth locating surfaces. Portions of a plane of the slide which are close to edges of two sides are attached to the depth locating surfaces, so that one capillary gap is formed between a slide surface and the capillary plane. One or more width locating blocks are provided at an outer edge of each depth locating surface which is far away from the capillary plane. A vertical distance between the width locating blocks located on different depth locating surfaces matches to a width of the slide to play a stopping function. The bottom locating block is provided at a bottom of the depth locating surface. The reservoir opening surface is connected with an upper end of the capillary plane and forms an angle A1, and A1 is a plane angle of 1° to 175°. Two sides of the reservoir opening surface are each connected with one reservoir side surface. The reservoir opening surface and two reservoir side surfaces and a slide plane together constitute one reagent loading reservoir which is connected with the capillary gap, and a bottom of the capillary gap has a gap opening. A length of the slide cover plate corresponds to or is equal to that of the slide, one label dent is provided on one side of the reservoir side surface which is attached to the slide plane, that is, upper ends of the two depth locating surfaces are each provided with one label dent, and when the label is attached to the slide, the label dent provides enough space for containing a thickness of the label, enabling the slide cover plate to be pressed tight against the slide without being affected by whether the label is attached to the slide. Outer sides of the two reservoir side surfaces are provided with top stripes for enhancing a friction between the reservoir side surface and the finger. A vertical distance between the capillary plane and the depth locating surface is 0.01 to 0.5 mm, so that after the slide cover plate is pressed tight against the slide, one capillary gap having a spacing of 0.01 to 0.5 mm is formed between the slide surface and the capillary plane. A thickness of the width locating block that is higher beyond the depth locating surface is 0.1 to 1 mm. The bottom locating block is upward hook-like, and the bottom locating block and the width locating block together determine a relative position after the cover plate is pressed against the slide, and assist keeping the cover plate being pressed tight against the slide.

Further, one or more individual containers and a corresponding individual heater are provided, for simultaneously carrying out the heat treatments of the slide specimen at different temperatures, in different circumstances or by different operation procedures.

Further preferably, in the heat treatment, the heating medium in the container may be simply heated to boiling. The temperature of the heat treatment is controlled by selecting a heating medium having a corresponding boiling point, achieving uniformity, reliability and repeatability for the heat treatment. The slide remains in one same device without moving during the whole process of slide specimen processing.

Compared with the prior art, the present invention has following advantages and technical effects:

There's no need to take or transfer the slide manually during the whole process of the slide specimen processing, reducing manual intervention and interference, not only saving time but also simplifying the operation steps and reducing operation errors.

In the heat treatment of the slide assembly, a plurality of slide assemblies in one same container are heated and controlled by a single heating controller, guaranteeing the uniformity of the heat treatment.

In the heat treatment of the slide assembly, the heating medium may be simply heated to boiling, and the temperature of the heat treatment is controlled via the boiling point of the heating medium, achieving uniformity of the heat treatment and having characteristics of high reliability and repeatability.

It is impossible that the slide specimen becomes dried during the slide specimen processing.

The V-shape insertion slot structurally fits with the slide assembly, and the rack device has a simpler and tighter structure, enabling the container to contain more slide assemblies. When in use, it only requires the fingers to clamp the top stripes portions of two reservoir side surfaces, so that it is easy to insert the slide assembly into the insertion slot. Uneven stressing generating when a top end of the slide is pressed and separation of the slide from the slide cover plate owing to deviation of a stressing direction are prevented, guaranteeing the formation and accuracy of the capillary gap and making the operation simpler and faster. Besides, arrangement of the slide assemblies can be tighter, which further saves space and enhances a processing efficiency.

DETAILED DESCRIPTION OF THE PREFERRED EMBODIMENT

The present invention is further described below in combination with specific embodiments, but implementations and protection of the present invention are not limited by these.

Figure 1:
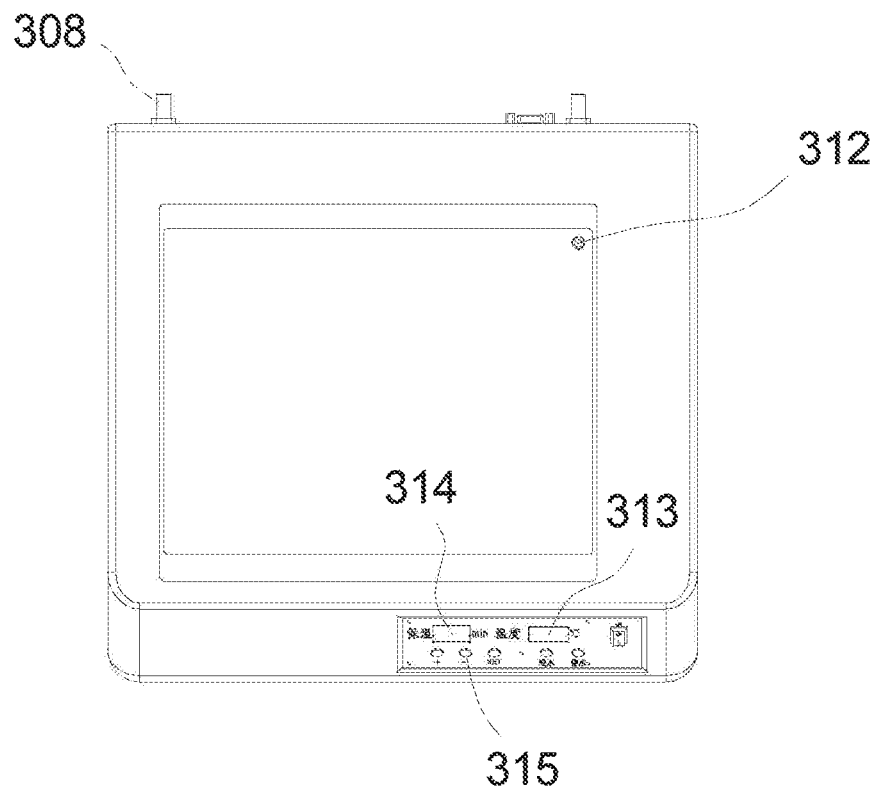
FIG. 1 shows a diagram of a heat treatment device for slide specimen testing in the present invention.
Figure 2:
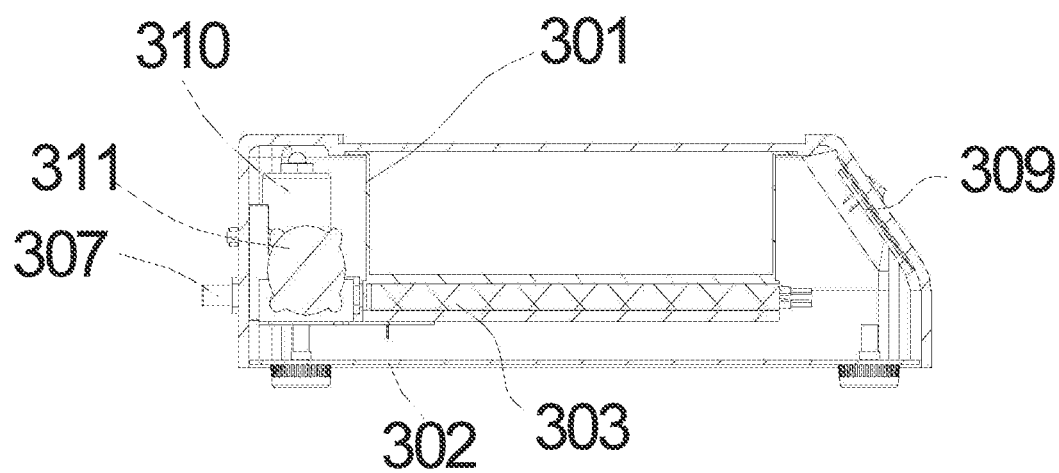
FIG. 2 shows a sectional view of the heat treatment device for slide specimen testing in the present invention.

As shown in FIGS. 1 and 2, a heat treatment device for slide specimen testing, comprises a container 301, a base 302, a heater 303, a liquid outlet 307, a liquid inlet 308, a controller 309 and a thermocouple 312.

The heater 303 is located above the base 302 and below the container 301; the container 301 is used for placing a heating medium and one or more slide racks 602; the controller 309 is used for controlling the heater to start and to stop, and the heater is used for heating the medium in the container 301; the thermocouple 312 is placed inside the container, and the thermocouple 312 performs a real-time sense on a temperature in the container 301 and transfers a sensed data to the controller 309.

The liquid inlet 308 allows a heating medium or reagent stored in an external container to be added to the container 301 quantitatively when required; and the liquid outlet 307 allows the heating medium or liquid in the container 301 to be discharged from the container. The liquid inlet 308 and the liquid outlet 307 on the container are respectively further connected with a micropump or a magnetic valve, and the controller controls operation of the micropump or the magnetic valve, then realizing control of filling the container with liquid or discharging liquid from the container. In the present embodiment, the liquid outlet 307 is connected with a drainage pump 310 for discharging the liquid from the container when necessary; and the liquid inlet 308 is connected with a feeding pump 311 for filling the container with liquid when necessary. In the embodiment, such device further provides a heat treatment time (temperature maintaining time) display module 314 for showing a time duration of the heat treatment and a temperature maintaining time adjustment button 315 for setting a time duration of the temperature maintaining.

As an embodiment, filling and discharging of the heating medium can also be realized by controlling on and off of the magnetic valve, using the effect of gravity to fill the container with liquid or to discharge liquid from the container. Controllers such as PIC MCU, MCU-51 or PLC controller are used. Power-on and power-off of a relay are controlled by the controller, thereby realizing start and stop of the heating function, and realizing control of opening and closing for the inlet and the outlet.

As an embodiment, the heater 303 which is provided at a bottom of the container adopts electrical bar heating, electrical wire heating, microwave heating, electromagnetic induction heating or thermo medium cyclic heating; and the heater 303 and the container 301 form a connected structure or a detachable structure.

Figure 3:
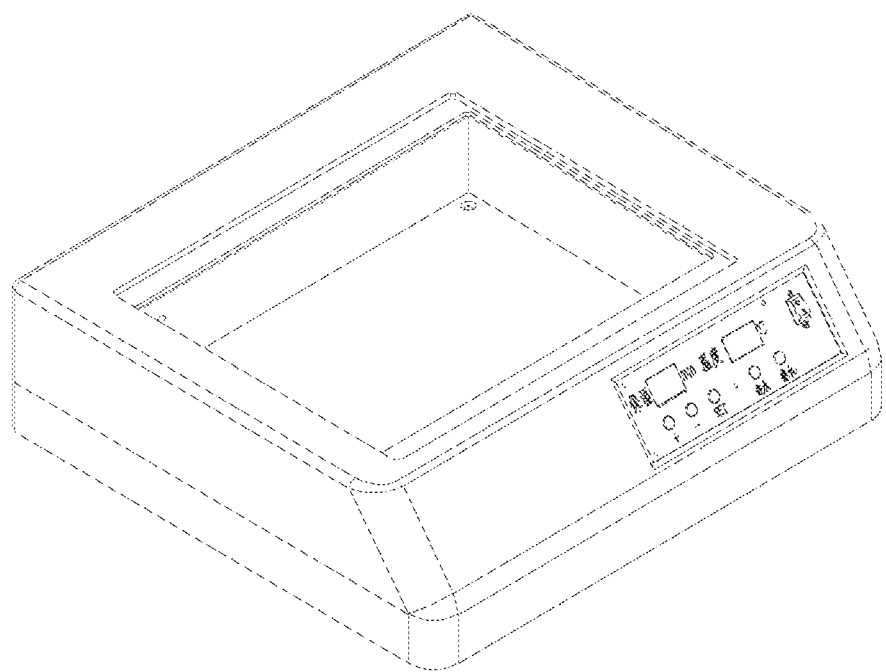
FIG. 3 shows a perspective view of the heat treatment device shown in FIG. 1.

As shown in FIG. 1 or FIG. 3, an edge of the container is a right-angle structure. The right-angle structure of the container edge is favorable to sufficiently using the container to put a slide rack 602. A bottom of the container is a plane structure, which is favorable to exhausting the liquid in the container.

Figure 4:
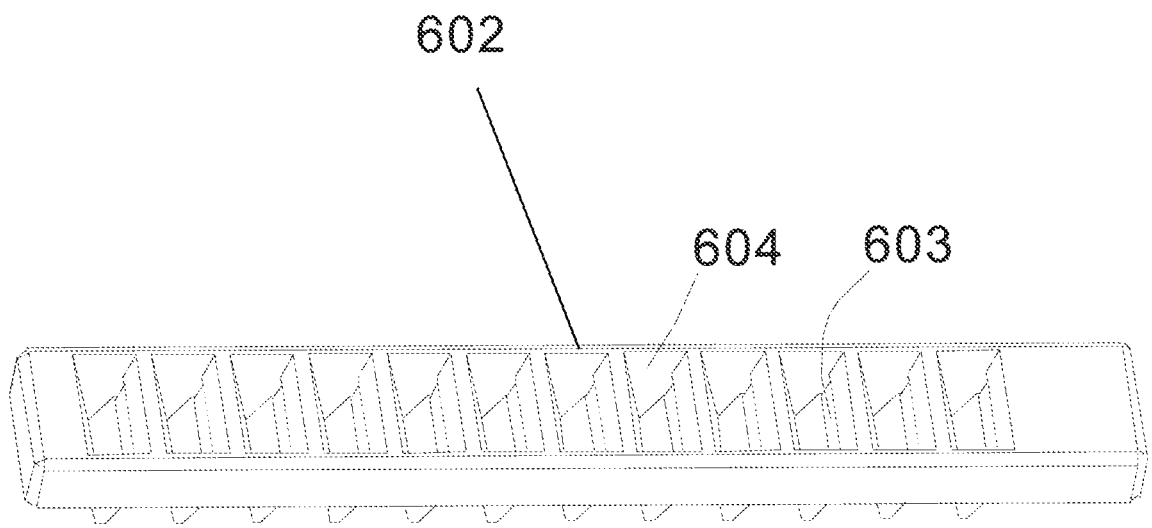
FIG. 4 shows a diagram of a slide rack in the embodiment.
Figure 5:
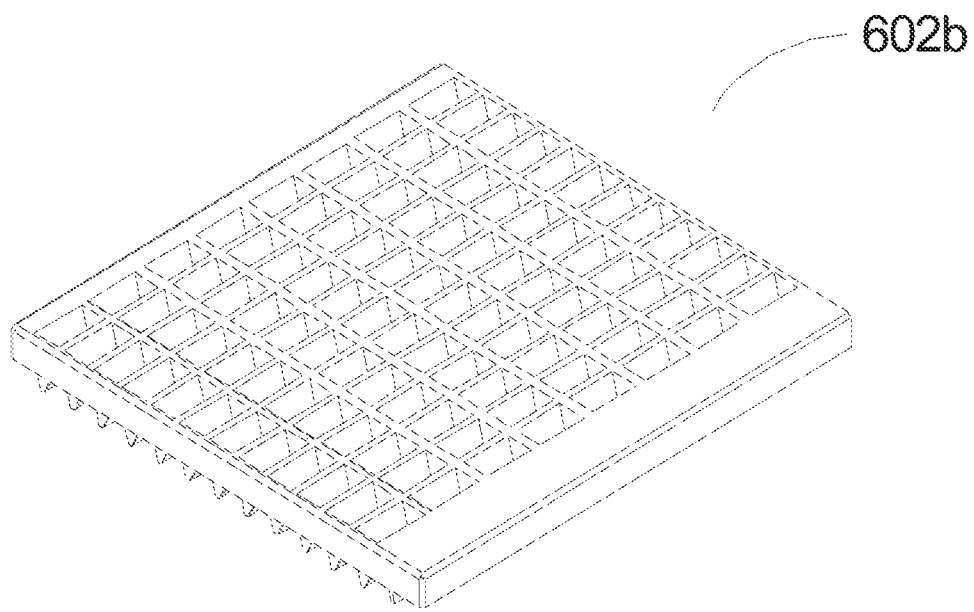
FIG. 5 shows a diagram of a slide rack provided with multi-column insertion slots in the embodiment.
Figure 6:
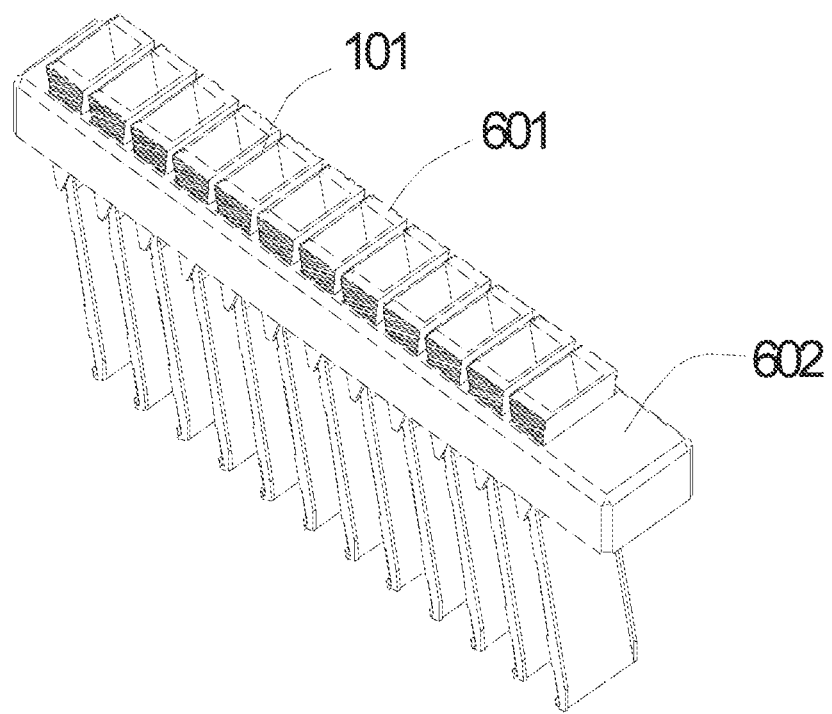
FIG. 6 shows a diagram of the slide rack shown in FIG. 4 inserted with slide assemblies thereon.
Figure 7:
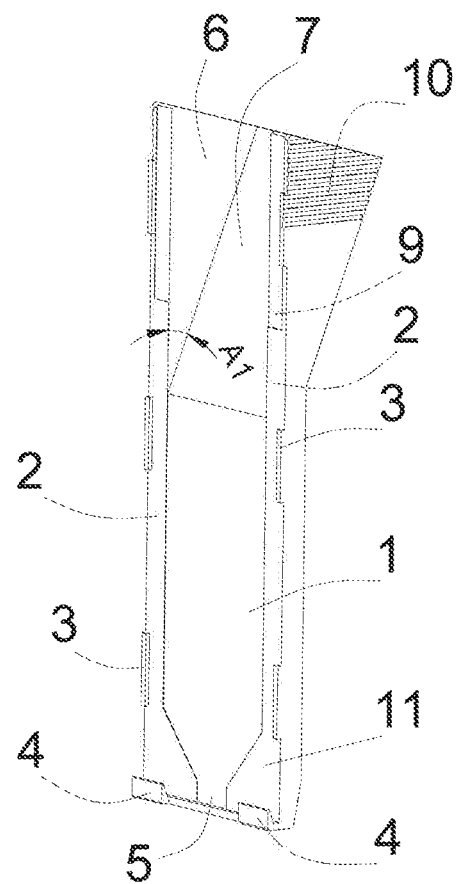
FIG. 7 shows a diagram of a cover plate of the slide assembly in the embodiment.
Figure 8:
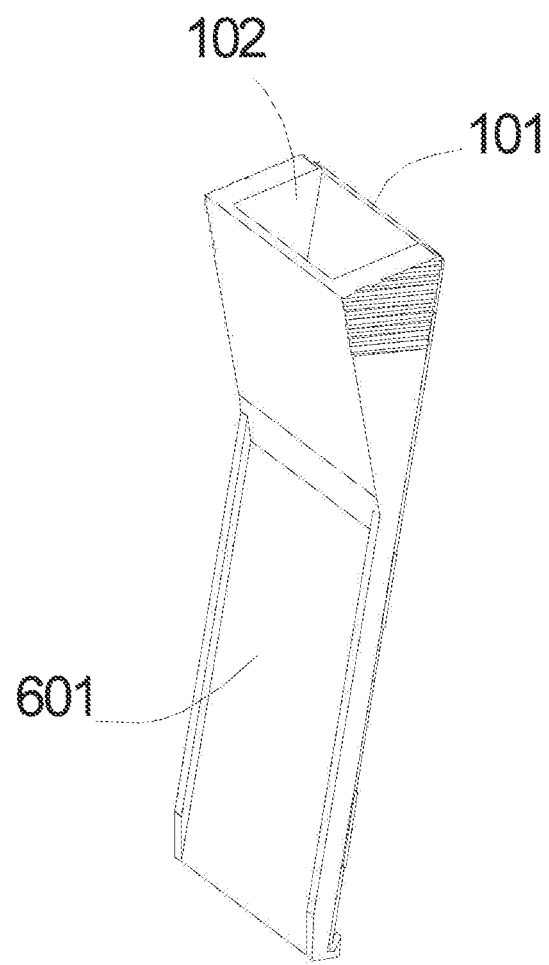
FIG. 8 shows a diagram of the slide assembly in the embodiment.
Figure 9A:
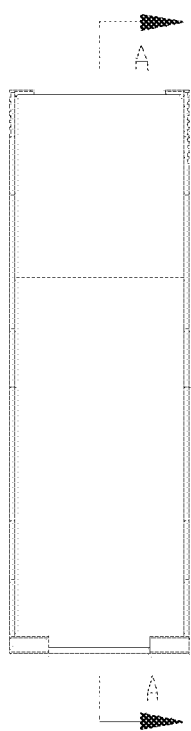
FIG. 9a shows a front projected view of FIG. 8.
Figure 9B:
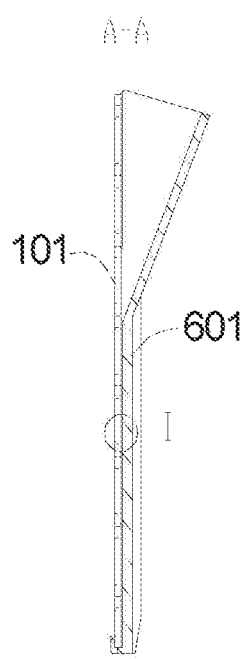
FIG. 9b shows a side view of FIG. 8.
Figure 9C:
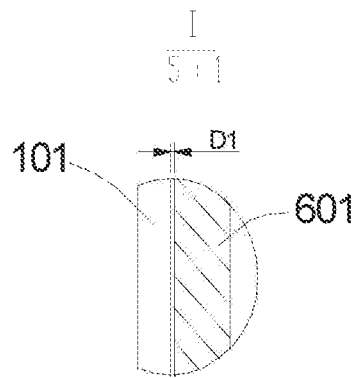
FIG. 9c shows a partial enlarged view of FIG. 8.
Figure 10A:
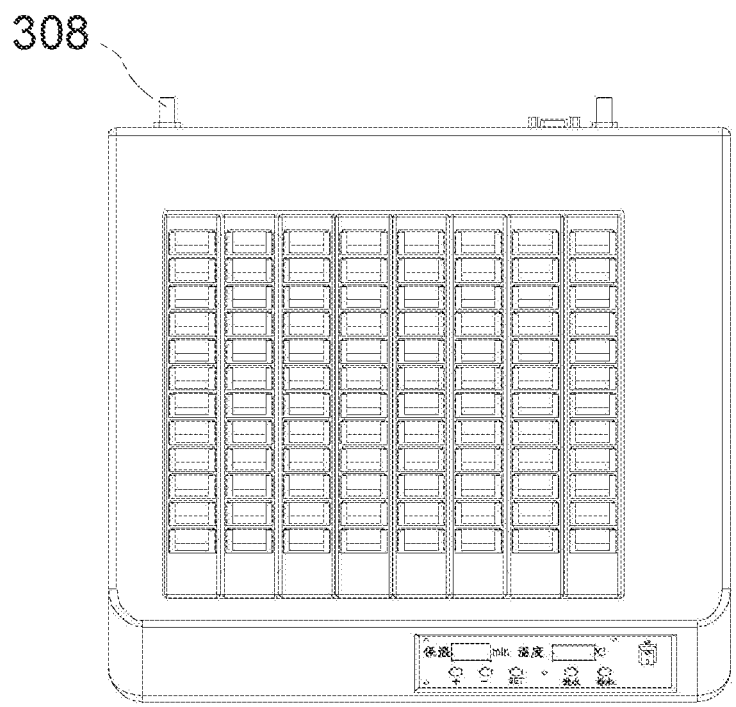
FIG. 10a and FIG. 10b respectively show a top view and a sectional view of a container of the heat treatment device in the embodiment, which is hung with the slide rack having multi-column V-shape insertion slots.
Figure 10B:
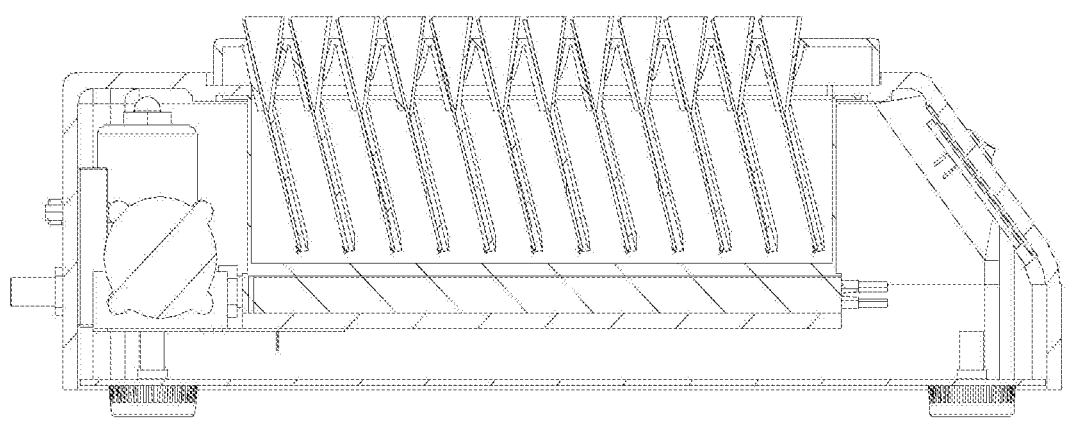

As shown in FIGS. 4 and 5, the slide rack 602 is provided with a plurality of integrated V-shape insertion slots 604, and a spring piece 603 is fixed inside each V-shape insertion slot 604. A plurality of V-shape insertion slots are arranged in one column closely. FIG. 4 shows a slide rack 602 having a column of V-shape insertion slots, and FIG. 5 shows a slide rack 602b having multi-column V-shape insertion slots. Several sets (several columns) of slide racks (602 or 602b) in parallel can be hung in the container. The slide rack 602 is made of a heat-resisting material which can endure the heat treatment process during the slide specimen testing. The spring piece and the slide rack are made of the heat-resisting material, and the spring piece may also be made of a sheet metal. Each V-shape insertion slot 604 is provided with a slide assembly, and a plurality of slide assemblies are heated in one same container 301 at a temperature which is controlled by a single controller, rather than that each slide specimen is heated separately at an independently controlled temperature. The assembly which is assembled by a slide 101 fitting with a slide cover plate 601, is inserted along the insertion slot 604 on the slide rack 602. A surface of the slide cover plate 601 presses a plate-type spring 603, and a generated spring pressure is applied on the slide 101 and the slide cover plate 601, to play a function of clamping.

As shown in FIGS. 7, 8 and 9a to 9c, the cover plate comprises a capillary plane 1, a depth locating surface 2, a width locating block 3, a bottom locating block 4, a reservoir side surface 6 and a reservoir opening surface 7; two depth locating surfaces 2 are provided above two lateral sides facing toward each other of the capillary plane 1, and the capillary plane 1 is parallel to the depth locating surfaces; portions of a plane of the slide which are close to edges of two sides are attached to the depth locating surfaces 2, so that one capillary gap is formed between a slide surface and the capillary plane 1; one or more width locating blocks 3 are provided at an outer edge of each depth locating surface 2 which is far away from the capillary plane 1; a vertical distance between the width locating blocks 3 located on different depth locating surfaces 2 matches to a width of the slide to play a stopping function; the bottom locating block 4 is provided at a bottom of the depth locating surface 2; the reservoir opening surface 7 is connected with an upper end of the capillary plane 1 and forms an angle A1, and A1 is a plane angle of 1° to 175°; two sides of the reservoir opening surface 7 are each connected with one reservoir side surface 6; the reservoir opening surface 7 and two reservoir side surfaces 6 and a slide plane together constitute one reagent loading reservoir which is connected with the capillary gap, and a bottom of the capillary gap has a gap opening; a length of the slide cover plate corresponds to or is equal to that of the slide, one label dent 9 is provided on one side of the reservoir side surface 6 which is attached to the slide plane, that is, upper ends of the two depth locating surfaces 2 are each provided with one label dent 9, and when the label is attached to the slide, the label dent provides enough space for containing a thickness of the label, enabling the slide cover plate to be pressed tight against the slide without being affected by whether the label is attached to the slide; outer sides of the two reservoir side surfaces 6 are provided with top stripes 10 for enhancing a friction between the reservoir side surface 6 and the finger; a vertical distance between the capillary plane 1 and the depth locating surface 2 is 0.01 to 0.5 mm, so that after the slide cover plate is pressed tight against the slide, one capillary gap having a spacing of 0.01 to 0.5 mm is formed between the slide surface and the capillary plane 1; and a thickness of the width locating block 3 that is higher beyond the depth locating surface 2 is 0.1 to 1 mm; the bottom locating block 4 is upward hook-like, and the bottom locating block 4 and the width locating block 3 together determine a relative position after the cover plate is pressed against the slide, and assist keeping the cover plate being pressed tight against the slide. A bottom of the capillary plane 1 is further provided with two guiding angles 11; and one funnel-type guiding opening 5 is formed between the two guiding angles, and allows solution in the capillary plane to flow out of the guiding opening.

A specimen section is attached on the slide and located on the slide surface in the capillary gap. When a reagent is added to the reagent loading reservoir, owing to the effects of gravity and capillary siphoning, the reagent enters the capillary gap from the reagent loading reservoir and covers on the specimen. When in use, it only requires the fingers to clamp the top stripes portions of two reservoir side surfaces, so that it is easy to insert the slide assembly into the insertion slot. Separation of the slide from the slide cover plate resulted from uneven stressing when a top end of the slide is pressed is prevented, guaranteeing formation and accuracy of the capillary gap and making the operation simpler and faster. Besides, arrangement of the slide assemblies can be tighter, which further saves space and enhances a processing efficiency.

All components of the embodiment are made of a material that is able to remain non-deformed or not-soften when enduring 80° C. or above.

As an embodiment, one or more individual containers and a corresponding individual heater can be provided, for simultaneously carrying out the heat treatments of the slide specimen at different temperatures, in different circumstances or by different operation procedures. When the slide assemblies are in the heat treatment, the heating medium inside the container 301 can be heated to boiling. A temperature of the heat treatment is controlled by a heating medium having a constant boiling point, achieving properties of the heat treatment such as uniformity, high reliability and repeatability.

According to the disclosure and teaching of the above description, those skilled in the art of the present invention may further modify and alter the above implementations. Therefore, the present invention is not limited by the above disclosure and the described specific implementations, and some alteration and modification of the present invention shall also fall into the scope of protection as claimed by the claims of the present invention.

What is claimed is:

1. A heat treatment device for slide specimen testing, comprising a container, a base, a heater, a liquid outlet, a liquid inlet, a controller and a thermocouple; wherein
   the heater is located above the base and below the container; the container is configured for placing a heating medium and one or more slide racks; the controller is configured for controlling the heater to start and to stop, and the heater is configured for heating the heating medium in the container; the thermocouple is placed inside the container, and the thermocouple is configured to sense a real-time temperature in the container and transfers a sensed data to the controller;
   the liquid inlet allows a heating medium or reagent stored in an external container to be added to the container quantitatively when required; and the liquid outlet allows the heating medium or liquid in the container to be discharged from the container;
   the heat treatment device further comprises at least one slide rack, two ends of the slide rack are hung on two lateral sides facing toward each other of the container, so as to provide a gap between a bottom end of a slide assembly in the slide rack and a bottom of the container; the slide rack is provided with a plurality of integrated V-shape insertion slots which are upright or inclined, and a spring piece is fixed inside each of the V-shape insertion slots; the plurality of V-shape insertion slots are arranged in one column closely, and the slide rack comprises one or more columns of the V-shape insertion slots; an outline of an upper end of the slide assembly assembled by a slide and a cover plate matches with the V-shape insertion slot on the rack, so that the slide assembly is adapted to be inserted in the V-shape insertion slot on the slide rack, and a plurality of slide assemblies are arranged closely; the spring piece and the V-shape insertion slot of the slide rack form an integrated connection structure, or are configured as independent separation; when the independent separation is adopted, the spring piece is fixed inside the V-shape insertion slot by embedding or adhesion; when the slide assembly is inserted in the V-shape insertion slot, a surface of the cover plate presses the spring piece, and the spring piece is configured to clamp the slide and the cover plate.

2. The heat treatment device for slide specimen testing according to claim 1, wherein the heater adopts electrical bar heating, electrical wire heating, microwave heating, electromagnetic induction heating or thermo medium cyclic heating; and the heater and the container form a connected structure or a detachable structure.

3. The heat treatment device for slide specimen testing according to claim 1, wherein the liquid inlet and the liquid outlet on the container are respectively further connected with a micropump or a magnetic valve, and the controller is configured to control operation of the micropump or the magnetic valve, so as to realize control of filling the container with liquid or discharging liquid from the container.

4. The heat treatment device for slide specimen testing according to claim 1, wherein an edge of the container is a right-angle structure.

5. The heat treatment device for slide specimen testing according to claim 1, wherein a bottom of the container is a plane structure.

6. The heat treatment device for slide specimen testing according to claim 1, wherein each of the V-shape insertion slots is inserted with a slide assembly, and a plurality of slide assemblies in the same container are heated at a temperature controlled by a single controller.

7. The heat treatment device for slide specimen testing according to claim 6, wherein: when the slide assembly is in a heat treatment, the heating medium in the container is adapted to be heated to boiling, and a temperature of the heat treatment is adapted to be controlled by using a heating medium having a constant boiling point.

8. The heat treatment device for slide specimen testing according to claim 6, wherein the slide assembly is assembled by the slide and the cover plate; the cover plate comprises a capillary plane, a depth locating surface, a width locating block, a bottom locating block, a reservoir side surface and a reservoir opening surface; two depth locating surfaces are provided above two lateral sides facing toward each other of the capillary plane, and the capillary plane is parallel to the depth locating surfaces; portions of a plane of the slide close to edges of two sides are attached to the depth locating surfaces, so as to form one capillary gap between a slide surface and the capillary plane; one or more width locating blocks are provided at an outer edge of each of the depth locating surfaces far away from the capillary plane; a distance between the width locating blocks located on different depth locating surfaces matches to a width of the slide for stopping function; the bottom locating block is provided at a bottom of the depth locating surface; the reservoir opening surface is connected with an upper end of the capillary plane and forms an angle A1, and A1 is a plane angle of 1° to 175°; two sides of the reservoir opening surface are each connected with one reservoir side surface; the reservoir opening surface and two reservoir side surfaces and a slide plane together constitute one reagent loading reservoir connected with the capillary gap, and a bottom of the capillary gap has a gap opening; a length of the slide cover plate corresponds to or is equal to that of the slide, one label dent is provided on one side of the reservoir side surface attached to the slide plane, that is, upper ends of the two depth locating surfaces are each provided with one label dent, and when the label is attached to the slide, the label dent provides space for containing a thickness of the label, enabling the slide cover plate to be pressed tight against the slide without being affected by whether the label is attached to the slide; outer sides of the two reservoir side surfaces are provided with top stripes for enhancing a friction between the reservoir side surface and the finger; a distance between the capillary plane and the depth locating surface is 0.01 to 0.5 mm, so that after the slide cover plate is pressed tight against the slide, one capillary gap having a spacing of 0.01 to 0.5 mm is formed between the slide surface and the capillary plane; and a thickness of the width locating block higher beyond the depth locating surface is 0.1 to 1 mm; the bottom locating block is upward hook-like, and the bottom locating block and the width locating block together determine a relative position after the cover plate is pressed against the slide, and assist keeping the cover plate being pressed tight against the slide.

9. The heat treatment device for slide specimen testing according to claim 2, wherein one or more individual containers and a corresponding individual heater are provided, for simultaneously carrying out heat treatments of the slide specimen at different temperatures, in different circumstances or by different operation procedures.

10. The heat treatment device for slide specimen testing according to claim 3, wherein one or more individual containers and a corresponding individual heater are provided, for simultaneously carrying out heat treatments of the slide specimen at different temperatures, in different circumstances or by different operation procedures.

11. The heat treatment device for slide specimen testing according to claim 4, wherein one or more individual containers and a corresponding individual heater are provided, for simultaneously carrying out heat treatments of the slide specimen at different temperatures, in different circumstances or by different operation procedures.

12. The heat treatment device for slide specimen testing according to claim 5, wherein one or more individual containers and a corresponding individual heater are provided, for simultaneously carrying out heat treatments of the slide specimen at different temperatures, in different circumstances or by different operation procedures.

13. The heat treatment device for slide specimen testing according to claim 1, wherein one or more individual containers and a corresponding individual heater are provided, for simultaneously carrying out heat treatments of the slide specimen at different temperatures, in different circumstances or by different operation procedures.

14. The heat treatment device for slide specimen testing according to claim 6, wherein one or more individual containers and a corresponding individual heater are provided, for simultaneously carrying out heat treatments of the slide specimen at different temperatures, in different circumstances or by different operation procedures.

15. The heat treatment device for slide specimen testing according to claim 7, wherein one or more individual containers and a corresponding individual heater are provided, for simultaneously carrying out heat treatments of the slide specimen at different temperatures, in different circumstances or by different operation procedures.

16. The heat treatment device for slide specimen testing according to claim 8, wherein one or more individual containers and a corresponding individual heater are provided, for simultaneously carrying out heat treatments of the slide specimen at different temperatures, in different circumstances or by different operation procedures.

* * * * *